US011972937B2

(12) United States Patent
Booth et al.

(10) Patent No.: US 11,972,937 B2
(45) Date of Patent: Apr. 30, 2024

(54) FILAMENT ASSEMBLY

(71) Applicant: Micromass UK Limited, Wilmslow (GB)

(72) Inventors: Alastair Booth, Glossop (GB); Alvin Chua, Singapore (SG); Carl Chen, Victoria (AU); Marcus Dawber, Wilmslow (GB); Enchen Guo, Singapore (SG); Dennis Ong, Singapore (SG); Richard Tyldesley-Worster, Wilmslow (GB)

(73) Assignee: Micromass UK Limited, Wilmslow (GB)

( * ) Notice: Subject to any disclaimer, the term of this patent is extended or adjusted under 35 U.S.C. 154(b) by 609 days.

(21) Appl. No.: 17/057,736

(22) PCT Filed: May 31, 2019

(86) PCT No.: PCT/GB2019/051488

§ 371 (c)(1),
(2) Date: Nov. 23, 2020

(87) PCT Pub. No.: WO2019/229447

PCT Pub. Date: Dec. 5, 2019

(65) Prior Publication Data

US 2021/0210324 A1 Jul. 8, 2021

(30) Foreign Application Priority Data

Jun. 1, 2018 (SG) ........................... 10201804688V
Jul. 2, 2018 (GB) ...................................... 1810825

(51) Int. Cl.
*H01J 49/14* (2006.01)
*H01J 49/06* (2006.01)

(52) U.S. Cl.
CPC .......... *H01J 49/147* (2013.01); *H01J 49/067* (2013.01)

(58) Field of Classification Search
CPC ...... H01J 49/067; H01J 49/147; H01J 27/022; H01J 27/024; H01J 27/205; H01J 27/02;
(Continued)

(56) References Cited

U.S. PATENT DOCUMENTS 3,527,937 A * 9/1970 Delany ................ H01J 49/147 250/427
5,543,625 A * 8/1996 Johnson ................. H01J 27/20 250/427
(Continued)

FOREIGN PATENT DOCUMENTS

CN 2598132 Y 1/2004
CN 205508767 U 8/2016
(Continued)

OTHER PUBLICATIONS

Search Report in UK Patent Application No. GB1810825.8 mailed on Apr. 18, 2019.
(Continued)

*Primary Examiner* — David E Smith
(74) *Attorney, Agent, or Firm* — Schmeiser, Olsen & Watts LLP

(57) ABSTRACT

A filament assembly for mounting to a source assembly of a mass spectrometer, the filament assembly comprising a body having one of: an aperture to receive a corresponding spigot provided by a source assembly; or a spigot to be received in a corresponding aperture on a source assembly.

20 Claims, 6 Drawing Sheets

(58) Field of Classification Search
CPC .... H01J 27/26; H01J 1/16; H01J 35/06; H01J 35/16
See application file for complete search history.

(56) References Cited

U.S. PATENT DOCUMENTS

| | | | | |
|---|---|---|---|---|
| 5,703,372 | A | 12/1997 | Horsky et al. | |
| 5,763,890 | A | 6/1998 | Cloutier et al. | |
| 5,857,890 | A | 1/1999 | Ferran | |
| 2006/0097645 | A1 | 5/2006 | Horsky | |
| 2010/0239828 | A1 | 9/2010 | Cornaby et al. | |
| 2011/0018423 | A1* | 1/2011 | Sheng | H01J 37/08 313/231.41 |
| 2011/0174969 | A1 | 7/2011 | Seyfarth | |
| 2012/0098409 | A1 | 4/2012 | Dou | |
| 2012/0212157 | A1 | 8/2012 | Cornaby et al. | |
| 2015/0262782 | A1 | 9/2015 | Kobayashi et al. | |

FOREIGN PATENT DOCUMENTS

| | | | |
|---|---|---|---|
| CN | 106653528 | A | 5/2017 |
| CN | 106653556 | A | 5/2017 |
| CN | 207250295 | U | 4/2018 |
| JP | H07153368 | A | 6/1995 |
| JP | 2009117133 | A | 5/2009 |
| WO | 2009018231 | A1 | 2/2009 |
| WO | 2009060762 | A1 | 5/2009 |
| WO | 2011044409 | A1 | 4/2011 |
| WO | 2011046897 | A1 | 4/2011 |
| WO | 2015066246 | A1 | 5/2015 |

OTHER PUBLICATIONS

Search Report in UK Patent Application No. GB1810825.8 mailed on May 13, 2019.
Combined Search and Examination Report in UK Patent Application No. GB1810825.8 mailed on Dec. 19, 2018.
Search Report in UK Patent Application No. GB1907758.5 mailed on Nov. 6, 2019.
Search Report in UK Patent Application No. GB2013843.4 mailed on Sep. 23, 2020.
International Search Report and Written Opinion in PCT/GB2019/051488 mailed on Dec. 5, 2019.
"Filament Manufacture," SS Scientific Limited, 2018, https://www.s3vacuum.com/product-catalogue/filament-manufacture/.

* cited by examiner

FILAMENT ASSEMBLY

BACKGROUND TO THE INVENTION

The present invention relates generally to a filament assembly for a source assembly of a mass spectrometer, and associated components including a filament element. The present invention also relates to a source assembly and a filament.

Gas chromatography (GC) is a well-known analytical separation technique. A column containing a stationary phase is arranged in a GC oven. A sample is introduced into the column along with a mobile phase (carrier gas) and heated by the GC oven. The sample interacts with the stationary phase in the column and the components of the sample elute from the end of the column at different rates depending on their chemical and physical properties and affinity to the stationary phase. The mobile phase may comprise, for example, an inert or non-reactive gas such as helium or nitrogen.

It is known to interface the GC oven with a mass spectrometer (MS)—a so-called GC/MS system arrangement—for analysis of the separated components of the sample.

Generally speaking, a mass spectrometer comprises an ion source, a mass analyser and a detector. There are different types of ion sources. The ion source of a mass spectrometer of the type referred to in this specification includes an inner source assembly and an outer source assembly. The incoming components (GC eluent) of the sample from the GC are first introduced into the inner source assembly. Here, they are ionised by an ion source, upon colliding with electrons emitted by one or more filaments and are then emitted towards the outer source assembly which guides the ions through a series of ion lenses (extraction lens stack) towards an analyser and detector of the mass spectrometer. The extraction lens stack is typically secured to the analyser housing. In use, the inner source assembly mates with the outer source assembly.

The inner source may adopt one of a number of types of ion source, including electron ionisation (EI) and chemical ionisation (CI). The sample enters the ion source from the gas chromatography column into a volume of an inner source housing adjacent one or more filaments. Electrons emitted by the filament(s) interact with the sample molecules which serve to ionise them. A charged repeller then repels the ions towards the lens stack of the outer source assembly.

Aspects of the inventions disclosed herein relate generally to improvements to the various components of the inner source assembly. The terms 'inner source' and 'outer source' are used herein, in line with the above general definition, to increase clarity. Nevertheless, the respective components of the inner and outer source assemblies are likewise components of the source assembly as a whole.

Mass spectrometers are highly sensitive and accurate pieces of apparatus, and require regular maintenance and cleaning in order to maintain their optimal conditions of operation. It is beneficial if at least some of the maintenance can be carried out by a lab technician, on site, using conventional tools (if any). There is a desire to ensure that the maintenance is as straightforward as possible, reducing the opportunities for errors, minimising down time of the apparatus, and ensuring that the mass spectrometer operates effectively when reassembled.

Accordingly, one aspect of the present invention provides a filament assembly for mounting to a source assembly of a mass spectrometer, the filament assembly comprising a body having one of: an aperture to receive a corresponding spigot provided by a source assembly; or a spigot to be received in a corresponding aperture on a source assembly.

In at least one embodiment, the aperture/spigot has at least one keying feature.

In at least one embodiment, the aperture is configured to receive a corresponding spigot, or the spigot is configured to be received in a corresponding aperture, in a single rotational configuration.

In at least one embodiment, the aperture and/or spigot has no planes of symmetry, or only one plane of symmetry.

In at least one embodiment, the aperture and/or spigot has a cross section comprising a rounded rectangle or square, wherein the radius of one of the corners of the rounded rectangle or square is different to the radius of an opposite corner of the rounded rectangle or square.

In at least one embodiment, the filament assembly further comprises a bore passing through the body which is substantially coaxial with the aperture/spigot, the bore for passing a screw through the body and into the source assembly, to secure the filament assembly to the source assembly, in use.

In at least one embodiment, the aperture in the body is sized to receive a corresponding spigot provided by a said source assembly; or the spigot of the body is sized to be received in a corresponding aperture of said source assembly, with a substantially sliding fit.

In at least one embodiment, the filament assembly is configured such that when the aperture in the body receives a corresponding spigot of said source assembly; or the spigot of the body is received in a corresponding aperture of said source assembly, the body is substantially retained relative to the source assembly.

In at least one embodiment, the body further comprises at least two electrical contact pads provided on an outer surface.

In at least one embodiment, the electrical contact pads are at least partially composed of gold or are gold plated.

In at least one embodiment, the body further comprises a filament mounting.

In at least one embodiment, the filament mounting comprises two filament mounting arms, extending outwardly from the body.

In at least one embodiment, the filament mounting arms are comprised at least in part of Kovar™ or gold, or are gold plated.

In at least one embodiment, the body further comprises at least two electrical contact pads on an outer surface and each of the filament mounting arms is electrically connected to a respective one of the electrical contact pads.

In at least one embodiment, the arms are angled with respect to one another.

In at least one embodiment, the distal ends of the arm are closer to one another than the proximal ends thereof.

In at least one embodiment, at least a portion of each filament mounting arm proximal to the distal end comprises at least one flat portion.

In at least one embodiment, at least a portion of each filament mounting arm proximal to the distal end comprises first and second flat portions, parallel to one another.

In at least one embodiment, at least a portion of each filament mounting arm proximal to the distal end is substantially rectangular in cross section.

In at least one embodiment, the filament assembly further comprises a filament element, the filament element connected at each end to a respective one of the first and second arms proximate to the distal ends thereof.

In at least one embodiment the filament element is soldered to the distal ends of the filament mounting arms.

In at least one embodiment, the filament assembly further comprises a filament shroud, In at least one embodiment, the shroud is spot welded to at least one of the filament mounting arms.

In at least one embodiment, the body is comprised at least in part of ceramic.

In another aspect, there is provided a source assembly for a mass spectrometer, the assembly comprising: a volume housing for retaining a repeller assembly; and at least one filament assembly secured to the volume housing.

In at least one embodiment, the source assembly further comprises:

a base, the volume housing removably connectable to the base, and for retaining the repeller assembly therebetween.

In at least one embodiment, the base comprises a plurality of electrical terminals and at least one filament assembly comprises a plurality of electrical contact pads for connection with a respective one of the electrical terminals on the base.

In at least one embodiment, the electrical terminals on the base are spring-loaded pins.

In at least one embodiment, the volume housing is movable between a first axial position relative to the base in which the electrical terminals are not connected to the contact pads, and a second position relative to the base in which the electrical terminals are connected to the contact pads.

Another aspect of the present invention provides a filament assembly for mounting to a source assembly of a mass spectrometer, the filament assembly comprising at least two electrical contact pads on an outer surface.

In at least one embodiment, the electrical contact pads are at least partially composed of gold or are gold plated or coated.

In at least one embodiment, the electrical contact pads are coated by vacuum deposition or sputtering.

Another aspect of the present invention provides a filament assembly for mounting on a source assembly of a mass spectrometer, comprising:

a body; and two filament mounting arms extending outwardly from a surface of the body, wherein at least a portion of each filament mounting arm proximal to the distal end comprises first and second flat portions, parallel to one another.

In at least one embodiment, at least a portion of each filament mounting arm proximal to the distal end is substantially rectangular in cross section.

In at least one embodiment the two filament mounting arms are substantially identical to one another.

In at least one embodiment, the filament mounting arms are comprised at least in part of Kovar®.

In at least one embodiment the body further comprises at least two electrical contact pads on an outer surface and each of the filament mounting arms is electrically connected to a respective one of the electrical contact pads.

In at least one embodiment, the arms are angled with respect to one another.

In at least one embodiment, the distal ends of the arms are closer to one another than the proximal ends thereof.

In at least one embodiment, the filament assembly further comprises a filament element, the filament element connected at each end to a respective one of the first and second arms proximate to the distal ends thereof.

In at least one embodiment, the filament element is soldered to the distal ends of the filament mounting arms.

In at least one embodiment, the filament assembly further comprises a filament shroud.

In at least one embodiment, the body is comprised at least in part of ceramic.

Another aspect of the present invention provides a filament element for a source of a mass spectrometer, comprised at least in part of a metal and coated at least in part with at least one of yttrium oxide and thorium dioxide.

In at least one embodiment, the filament element is comprised at least in part of at least one of rhenium, platinum, iridium, molybdenum, tantalum and tungsten.

In at least one embodiment, the filament element is comprised of rhenium and coated in yttrium oxide.

In at least one embodiment, the filament element comprises a mesh.

Another aspect of the present invention provides a filament element comprising a mesh.

In at least one embodiment, the mesh is made at least in part of at least one of rhenium, platinum, iridium, molybdenum, tantalum and tungsten.

In at least one embodiment, the mesh is comprised of rhenium and coated in yttrium oxide.

BRIEF DESCRIPTION OF THE DRAWINGS

Embodiments of the present invention will now be described, by way of non-limiting example only, with reference to the figures in which.

DETAILED DESCRIPTION OF EMBODIMENTS OF THE INVENTION

Figure 7:
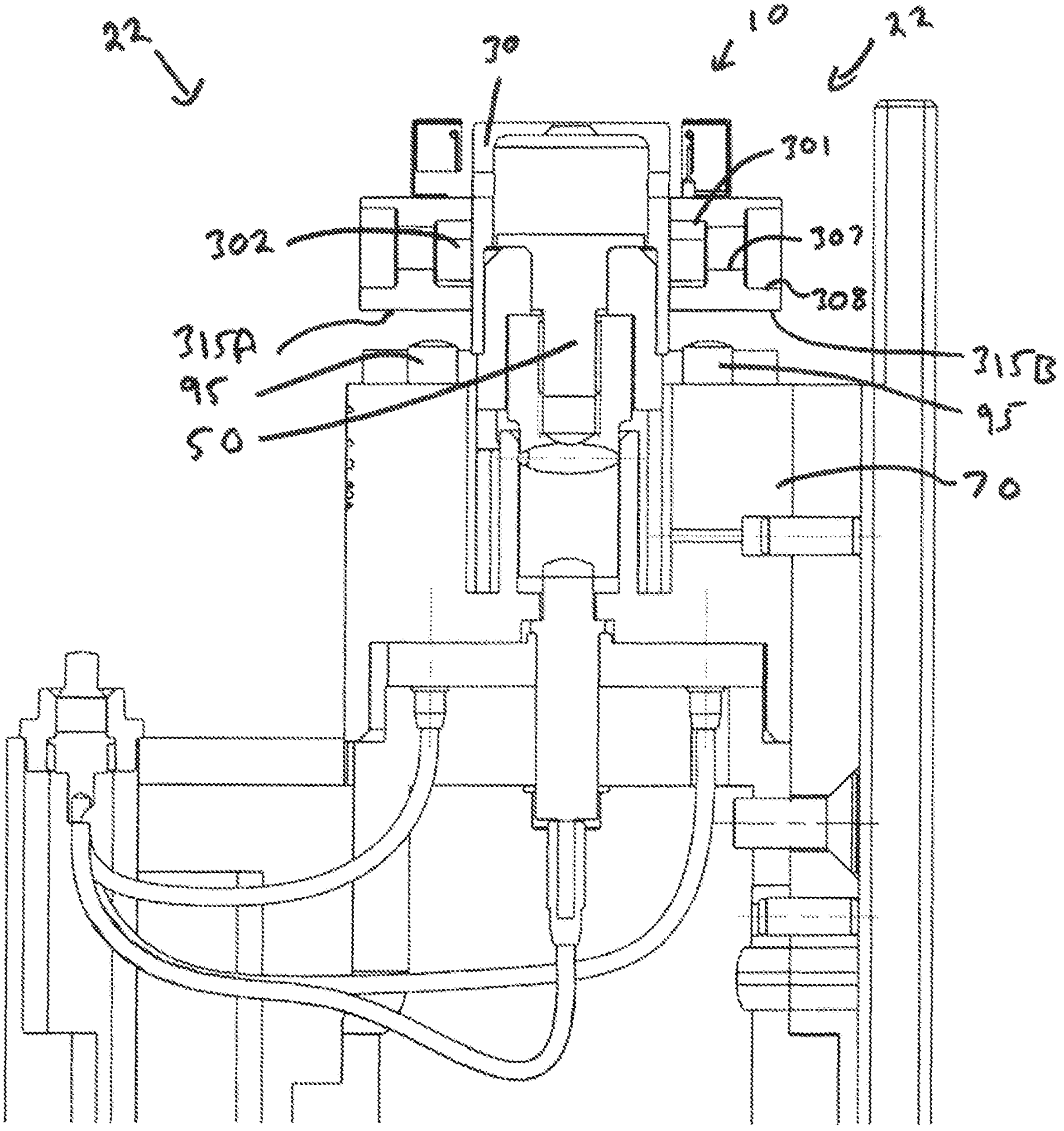
FIG. 7 illustrates a cross-section of the arrangement of an inner source assembly prior to insertion into a mass spectrometer housing.

In one aspect of the present invention there is provided a filament assembly 22 for mounting to a source assembly 1 of a mass spectrometer. The filament assembly 22 comprises a body 300. In the embodiments shown in the figures, the body 300 has a first aperture 301 which receives a corresponding spigot 302 provided on the source assembly 1 in use (see FIG. 5). The first aperture 301 extends into the body 300 by a predetermined depth. In at least one embodiment, as shown in FIG. 7, the first aperture 301 extends about a third of the way through the body 300.

In at least one embodiment, the first aperture 301 and the corresponding spigot 302 are provided with respective keying features, for example at least one keying surface.

Figure 1:
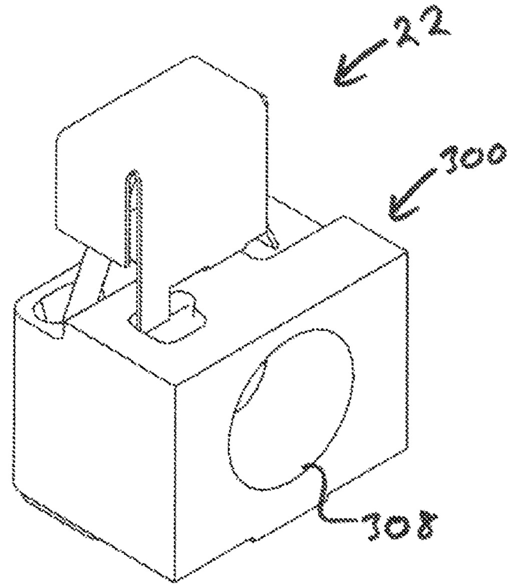
FIG. 1 illustrates a filament assembly.
Figure 2:
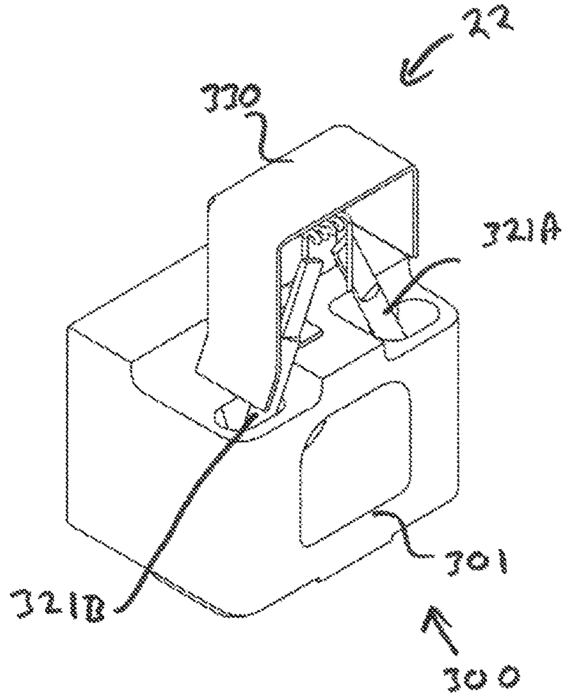
FIG. 2 illustrates the filament assembly of FIG. 1 from a different angle.
Figure 3:
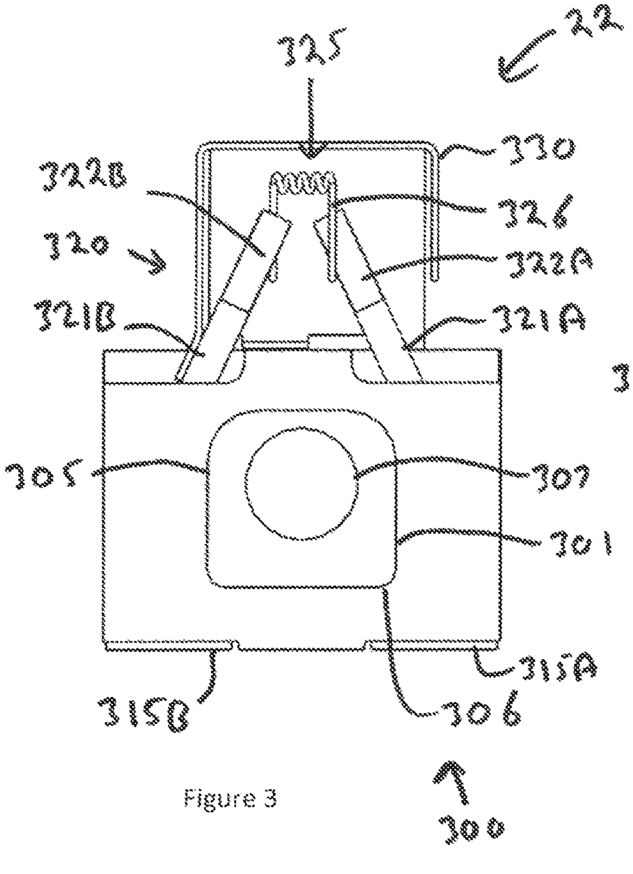
FIG. 3 illustrates the filament assembly of FIG. 1 viewed from one side.
Figure 4:
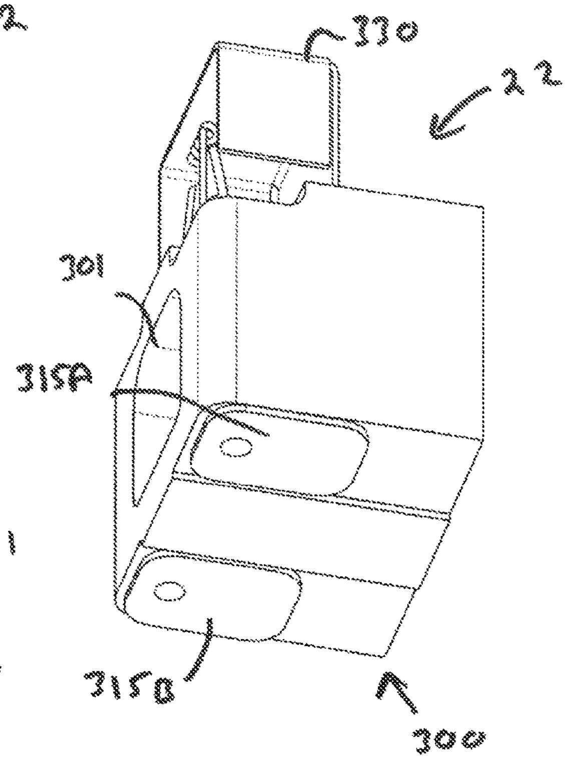
FIG. 4 illustrates the filament assembly of FIG. 1 viewed from below.

In an at least one embodiment, the first aperture 301 has a single plane of symmetry. In the embodiment illustrated, best seen in FIG. 3, the first aperture 301 has a cross-section comprising a rounded square. In another embodiment, the first aperture 301 may be a rounded rectangle. In another embodiment, the first aperture 301 may be other shapes having a single plane of symmetry. Alternatively, the first aperture 301 may have a cross-section having no plane of symmetry.

In at least one embodiment, the first aperture 301 can only receive a corresponding spigot 302 in a single orientation. Such an arrangement prevents the filament assembly 22 rotating with respect to the spigot 302 on which it is mounted, ensuring correct alignment between the filament assembly 22 and the ionisation chamber 30 in use. In at least one embodiment, illustrated in FIG. 3, the radius of one of the corners 305 of the rounded square of the first aperture 301 is different to the radius of the opposite corner 306 of the rounded square of the first aperture 301.

In at least one embodiment, the filament assembly 22 further comprises a bore 307 passing through the body 300, which may be substantially coaxial with the first aperture 301. The bore 307 is for passing a screw 309 (see FIG. 5) through the body 300 and into the source assembly 1, to secure the filament assembly 22 to the source assembly 1.

In at least one embodiment, the body 300 of the filament assembly 22 may further comprise a second aperture 308, which extends into the body 300 from the face opposite to that in which the first aperture 301 is provided. The bore 307 extends between the first aperture 301 and the second aperture 308. The first aperture 301, the bore 307 and the second aperture 308 are shown in cross-section in FIG. 7. In the embodiment shown, the second aperture 308 is substantially circular. In at least one embodiment, the diameter of the second aperture 308 may be larger than the bore 307. In at least one embodiment, the dimensions (diameter and depth) of the second aperture 308 are sized so as to receive the head of a screw 309 therein. Consequently, when the screw 309 is received into the second aperture 308, through the bore 307 and into the source assembly 1, the distal end of the head of the screw 309 may be substantially flush with the outer surface of the body 300 in which the second aperture 308 is provided.

Although in the embodiment shown, the bore 307 is generally coaxial with the first aperture 301, this is not essential. In another embodiment (not shown) a bore may be provided parallel to the axis of the first aperture 301, such that any corresponding screw does not pass through the first aperture 301 or spigot 302 at all.

In at least one embodiment, the first aperture 301 of the body 300 is sized so as to receive the corresponding spigot 302 provided by the source assembly 1 with a substantially sliding fit. In at least one embodiment, there may be a substantially interference fit.

In at least one embodiment, where the cross-section and dimensions of the first aperture 301 are sized so as to generally correspond (e.g. with a sliding or interference fit) to those of the corresponding spigot 302, the arrangement serves to at least loosely retain the filament assembly 22 on the spigot 302 during assembly. Consequently, this allows for substantially one-handed assembly, wherein a operator may first place the filament assembly 22 on the spigot 302 before securing it (e.g. with the screw 309). The corresponding fit of the first aperture 301 and spigot 302 serve to at least loosely retain the filament assembly 22 on the source assembly 1.

In at least one embodiment, the body 300 further comprises at least two electrical contact pads 315*a*, 315*b* provided on an outer surface of the body 300. In the embodiment shown, the electrical contact pads 315*a*, 315*b* are substantially rectangular in shape. The edges of the rectangle may be rounded. The surface area of the electrical contact pads 315*a*, 315*b* may be sized as to allow for some misalignment of the electrical contact pads 315*a*, 315*b* relative to the electrical terminals 95 but still to ensure electrical contact therebetween. The electrical terminals 95 may comprise resilient pins.

The resilient element (e.g. spring) inside the resilient pin causes the end of the pin to apply a force to the electrical contact pads 315*a*, 315*b* in use to ensure good electrical contact. In at least one embodiment, the resilient pins are pogo pins. The tip of the electrical terminal/pin may be dome-shaped, flat or any other shape. The shape of the electrical contact pads 315*a*, 315*b* and/or the electrical terminals 95 may be configured so as to ensure that the contact resistance therebetween is within predetermined parameters. In at least one embodiment, the contact resistance is less than 0.1 ohms.

In at least one embodiment, the electrical contact pads 315*a*, 315*b* may each comprise a depression located to receive the tip of the electrical terminal/pin in use. The shape of the depression may be configured to be substantially the same as that of the tip of the electrical terminal/pin so as to increase the contact surface area and thus reduce the contact resistance.

The electrical contact pads 315*a*, 315*b* and/or electrical terminals 95 may be at least partially composed of gold or are gold plated or coated. They may be coated by vacuum deposition. They may be coated by gold sputtering.

The plane of the surface of the first 315*a* and second 315*b* electrical contact pads is substantially parallel to the central longitudinal axis of the first aperture 301 and corresponding spigot 302.

In at least one embodiment, the filament assembly 22 further comprises a filament mounting 320. The filament mounting comprises two filament mounting arms 321*a*, 321*b*, which extend outwardly from the body 300. The filament mounting arms 321*a*, 321*b* may be comprised at least in part of Kovar®. Alternatively, the filament mounting arms 321*a*, 321*b* may be at least partially composed of gold or are gold plated or coated.

In at least one embodiment, each of the filament mounting arms 321*a*, 321*b* is physically and electrically connected to a respective one of the electrical contact pads 315*a*, 315*b*. In one embodiment, the connection between the filament mounting arms and the electrical contact pads is made through laser welding. After laser welding, the assembly may then be gold plated and inserted into the body 300 of the filament assembly 22.

In at least one embodiment, the filament mounting arms 321*a*, 321*b* extend from one surface of the body 300, and the electrical contact pads 315*a*, 315*b* are provided on an opposite surface of the body 300.

In at least one embodiment, the filament mounting arms 321*a*, 321*b* are angled with respect to one another. In other words, they are non-parallel. In the embodiment best illustrated in FIG. 3, the distal ends of the filament mounting arms 321*a*, 321*b* are closer to one another than at the proximal ends (adjacent the body 300).

In at least one embodiment, each filament mounting arm 321*a*, 321*b* is generally cylindrical. At least a portion of each filament mounting arm 321*a*, 321*b* proximal to the distal end comprises at least one flat portion 322*a*, 322*b*, 323*a*, 323*b*. In the embodiment illustrated, best seen in FIG. 10, at least a portion of each filament mounting arm 321*a*, 321*b* comprises first 322*a*, 322*b* and second 323*a*, 323*b* flat portions, parallel to one another. Consequently, at least a portion of each filament mounting arms 321*a*, 321*b* proximal to the distal end is substantially rectangular in cross-section. In at least one embodiment, the filament mounting arms 321*a*, 321*b* are substantially identical to one another.

Figure 10:
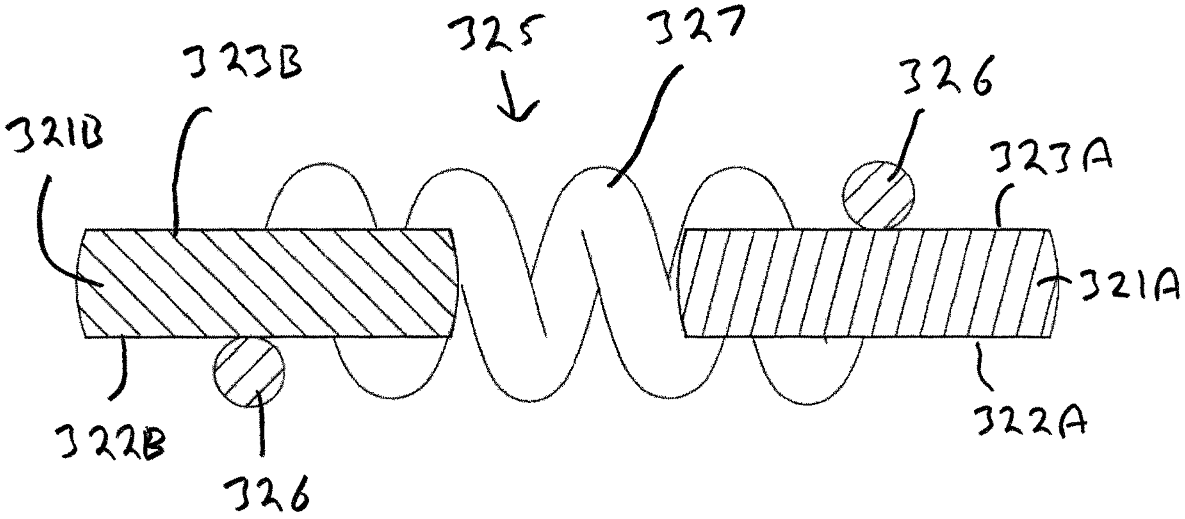
FIG. 10 illustrates a plan view of the filament element of FIGS. 1 to 4.

In at least one embodiment, as seen in FIG. 10, the filament assembly 22 further comprises a filament element 325. The filament element 325 may comprise a central coil 327 and a filament leg 326 at either end thereof. The filament element 325 is, in at least one embodiment, connected at each end to a respective one of the first 321*a* and second 321*b* arms proximal to the distal ends thereof. A first filament element leg 326 is electrically secured (e.g. soldered) to one of the flat portions 322*a*, 323*a* of the first filament mounting arm 321*a*. The other filament leg 326 is electrically connected (e.g. soldered) to a flat portion 322*b*, 323*b* of the other of the filament mounting arms 321*b*. In the embodiment shown in FIGS. 3 and 10, the leg 326 of the filament element 325 is secured to the first flat surface 322*a* of the first filament mounting leg 321 and to the second flat surface 323*b* of the second filament mounting arm 321*b*.

The filament element 325 may be soldered to the filament mounting arms 321*a*, 321*b*. The filament element may be comprised at least in part of at least one of rhenium, platinum, iridium, molybdenum, tantalum and tungsten.

In at least one embodiment, the filament assembly 22 further comprises a filament shroud 330, to at least partially shield the arms 321*a*, 321*b* and filament element 325 and/or to repel electrons.

The filament shroud 330 may be made of sheet metals such as aluminium alloys or stainless steel. In at least one embodiment, the filament shroud 330 is spot welded to one of the arms 321*a* or 321*b*, whichever is at a more negative voltage during filament operation. As a result, the shroud itself is electrically connected to the arm and will be at a more negative electric potential relative to the electrons emitted from the filament, helping to repel and redirect the electrons towards the ion chamber.

In at least one embodiment, the body 300 of the filament assembly 22 is comprised at least in part of ceramic.

In at least one embodiment, the filament assembly 22 is mounted to a source assembly 1. In at least some embodiments, there are two filament assemblies 22 provided on a single source assembly 1.

The filament assembly 22 may take different forms to that illustrated in FIGS. 1 to 4.

Figure 8:
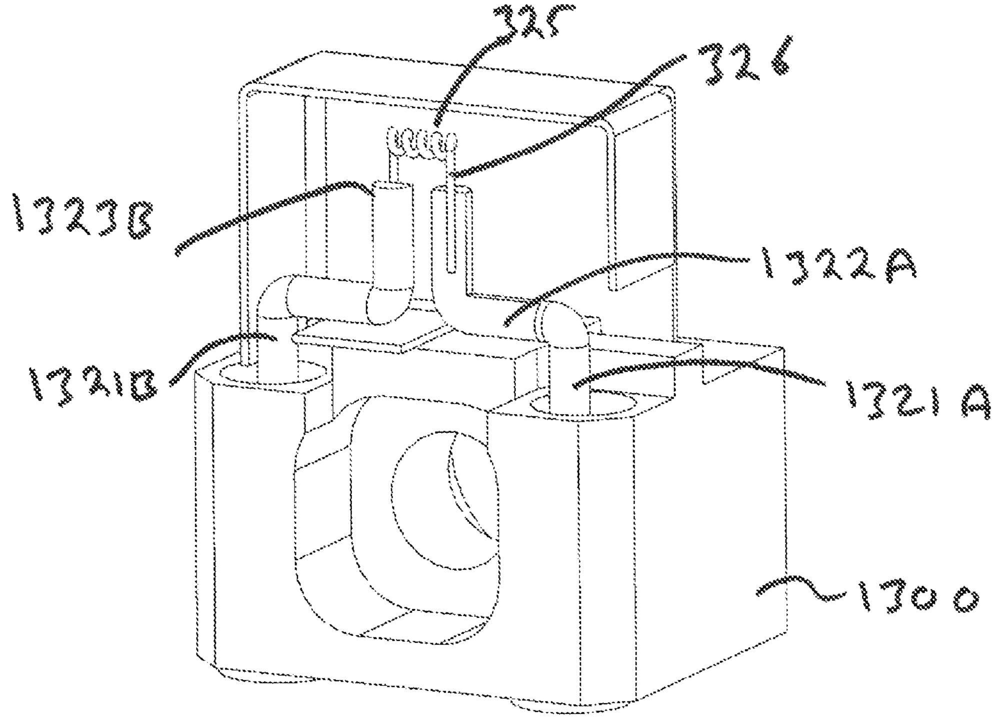
FIG. 8 illustrates a filament assembly according to another embodiment.

FIG. 8 illustrates a filament assembly 1022 having filament mounting arms 1321*a*, 1321*b* having a different form to the filament mounting arms 321*a*, 321*b* illustrated in FIGS. 1 to 4. With the filament assembly 1022 illustrated in FIG. 8, the filament mounting arms 1321*a*, 1321*b* are not straight. Instead, the filament mounting arms 1321*a*, 1321*b* are generally "Z shaped". Each filament mounting arm 1321*a*, 1321*b* comprises a linear proximal end which extends from the body 1300 of the filament assembly 1022. Each filament mounting arm 1321*a*, 1321*b* further comprises a mid-section which is perpendicular to the proximal section. Finally, the filament mounting arms 1321*a*, 1321*b* comprise a distal section which is perpendicular to the mid-section. Consequently, the proximal end distal sections of the filament mounting arms 1321*a*, 1321*b* are parallel with one another. Furthermore, the distal sections of each of the filament mounting arms 1321*a*, 1321*b* are parallel to one another. This allows for the legs 326 of the filament element 325 to be parallel with the distal ends of each of the filament mounting arms 1321*a*, 1321*b*, which may ensure a good electrical connection (e.g. by soldering) between the legs 326 of the filament element 325 and the distal ends of each of the filament mounting arms 1321*a*, 1321*b*. The filament mounting arms 1321*a*, 1321*b* may also comprise at least one flat section 1322*a*, 1323*b* at the distal end thereof. As with the embodiment illustrated in FIG. 3, the flat sections 1322*a*, 1323*b* of the filament assembly 1022 illustrated in FIG. 8 face different directions.

Figure 9:
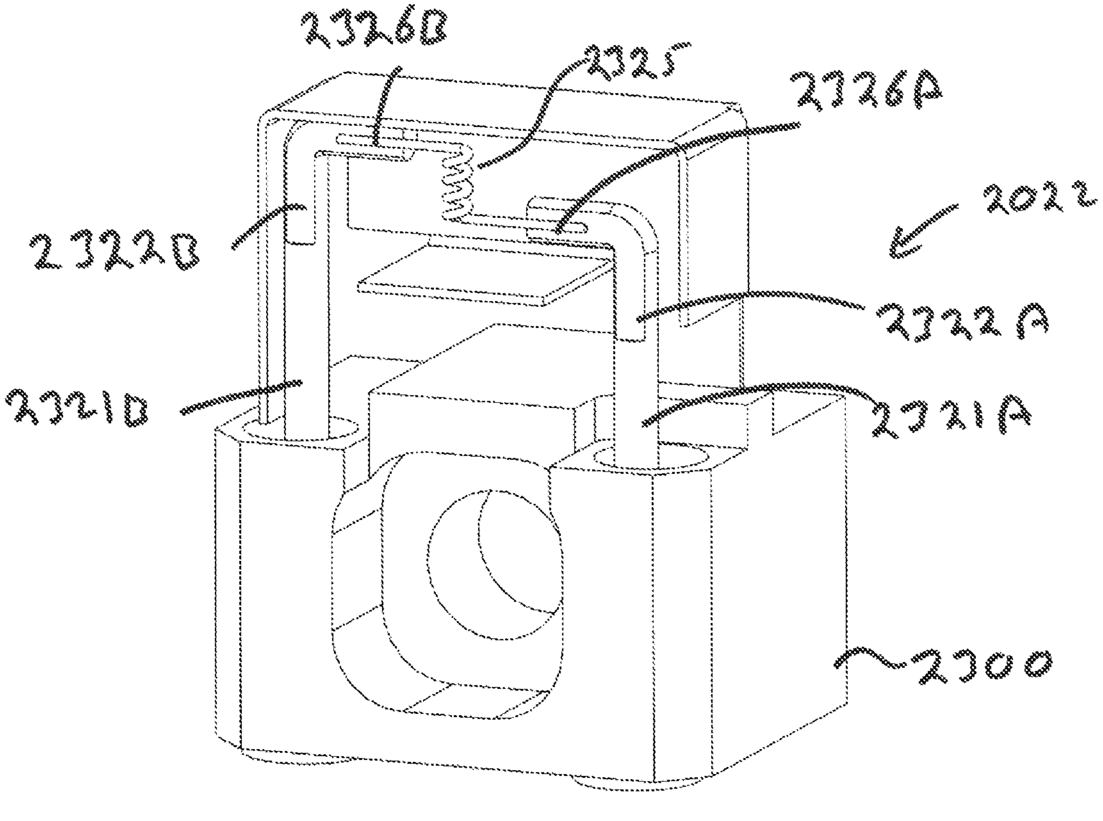
FIG. 9 illustrates a filament assembly according to yet another embodiment.

FIG. 9 illustrates another filament assembly 2022 embodying the present invention, in which the filament mounting arms 2321*a*, 2321*b* take a different form to those illustrated in FIGS. 1 to 4 and 8. The filament mounting arms 2321*a*, 2321*b* of the filament assembly 2022 comprise a right angle bend along their length, such that the distal sections of each of the filament mounting arms 2321*a*, 2321*b* generally face towards one another and are parallel with one another (by an offset). The filament element 2325 for use with the filament assembly 2022 shown in FIG. 9 comprises two filament element legs 2326*a*, 2326*b* which extend in opposing directions. As indicated, one leg 2326*a* of the filament element 2325 is arranged parallel to the axis of the distal end of the first filament mounting arm 2321*a*, and the second leg 2326*b* is arranged parallel to the central axis of the distal end of the second filament mounting arm 2321*b*. The distance (offset) between distal ends of the filament mounting arms 2321*a*, 2321*b* is equal to the distance (offset) between the filament element legs 2326*a*, 2326*b*.

As with the other embodiments 22, 1022, the filament assembly 2022 may comprise at least one flat section 2322*a*, 2322*b* on a distal end of the filament mounting arms 2321*a*, 2321*b*.

Figure 5:
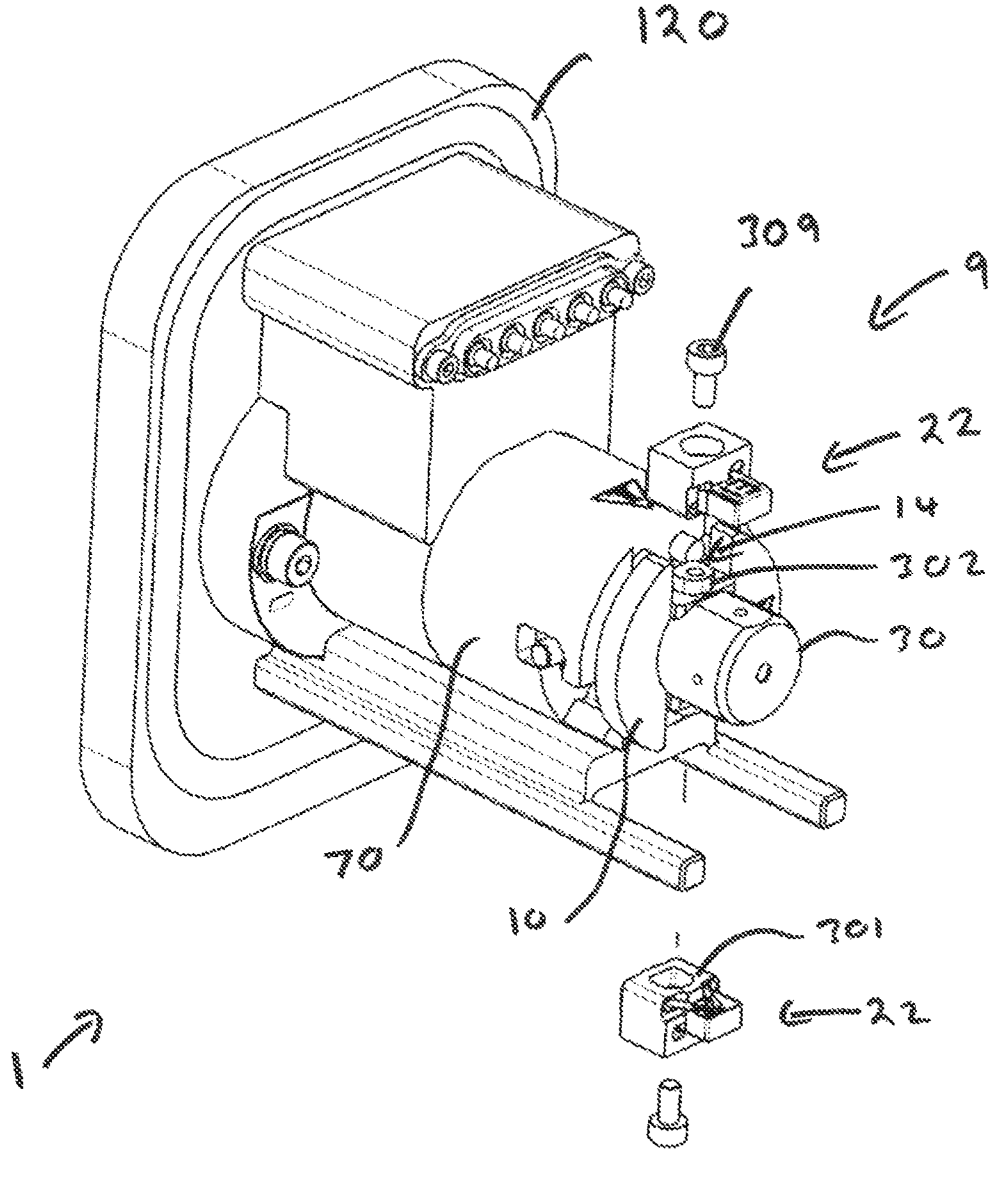
FIG. 5 is a partially exploded view of the assembly of a volume housing onto a base.
Figure 6:
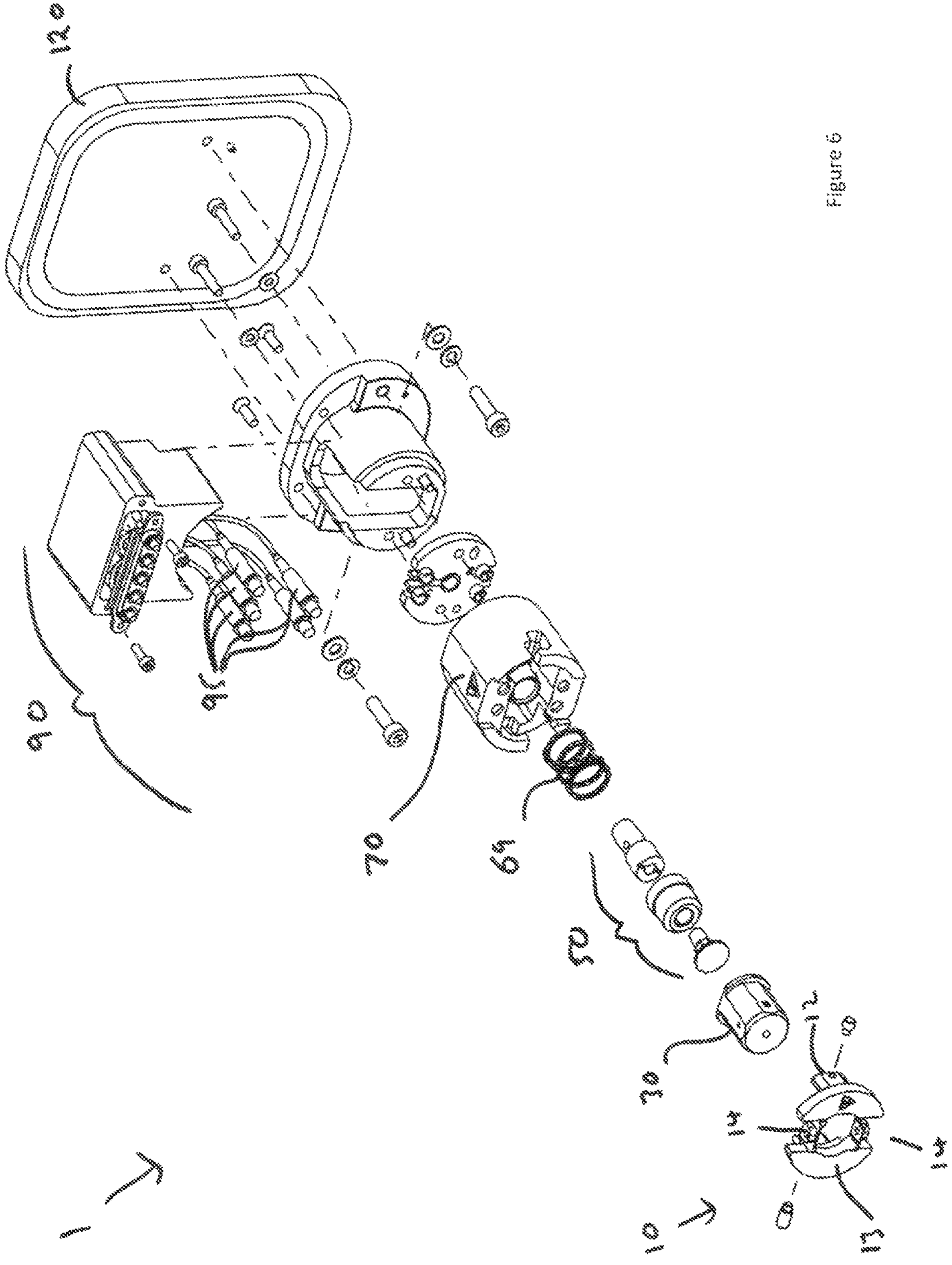
FIG. 6 illustrates an exploded view of an inner source assembly.

The inner source assembly 1 illustrated in FIGS. 5 and 6 generally comprises a volume housing 10, an ionisation chamber 30, a repeller assembly 50, a resilient element 69, an ionisation chamber base 70, a wiring assembly 90, and a sealing plate 120

The volume housing 10 is removably connectable to the base 70 and, in use, retains a repeller assembly 50 and ionisation chamber 30 therebetween. In at least one embodiment, the volume housing 10 is not rigidly connected to the base 70, but is selectively movable with respect thereto, as will be described below.

In effect, the volume housing 10 is a retaining element, to retain the repeller assembly 50 and ionisation chamber 30 on the base 70, and to act as a mounting for the filament assembly(ies) 22.

The volume housing 10 comprises a generally planar body 11 having two longitudinally extending arms 12 extending perpendicularly therefrom. The planar body 11 of the volume housing 10 comprises two diametrically opposed wings 13 which in use, contact a heated source block of an outer source assembly. The two wings 13 define filament mounting bays 14 therebetween which receive, in use, two filament assemblies 22 (shown in FIG. 5). The volume housing 10 illustrated is for an EI source, requiring two filament assemblies 22. A volume housing for use with a CI source (not shown) may only have a single mounting bay 14, for a single filament assembly 22. Alternatively, a volume housing for use with a CI source may have two filament mounting bays, but only a single filament assembly 22 may be installed.

Referring to FIGS. 6 and 7, there is provided an inner source assembly 1 for a mass spectrometer 200 comprising a base 70 and a volume housing 10. The base 70 comprises a plurality of electrical terminals 95. The volume housing 10 is movably retained on the base 70 for retaining a repeller assembly 50 and ionisation chamber 30 therebetween. The volume housing 10 is movable between a first axial position relative to the base 70 in which the respective electrical terminals 95 are not electrically connected to the electrical contact pads 315*a*, 315*b* (shown in FIG. 7); and a second position relative to the base 70 in which the respect electrical terminals 95 are electrically connected to the electrical contact pads 315*a*, 315*b*. Furthermore, the inner source assembly 1 comprises a biasing element 69 urging the volume housing 10 into the first position (i.e. away from the second position).

A benefit of this arrangement is that, when the inner source assembly 1 is not installed in and secured to a mass spectrometer housing, the terminals 95 of the base 70 are not connected to the contact pads 315*a*, 315*b* of the volume housing 10. In an embodiment where the terminals 95 comprise resilient pins, this serves to avoid damage/fatigue to the springs of the resilient pins. In at least one embodiment, the distance of axial travel between the first and second axial positions of the volume housing 10 relative to the base 70 is larger than the maximum travel of the resilient pins, such that when the volume housing 10 is urged into the first position by the biasing element 69, the volume housing 10 is clear from contact with the distal ends of the resilient pins.

In the embodiments illustrated, the filament assembly 22 comprises a filament body 300, electrical contact pads 315*a*, 315*b*, filament mounting arms 321*a*, 321*b*, a filament element 325 and a filament shroud 330. It is not essential for the filament assembly 22 to comprise all of these features.

Accordingly, in another aspect of the present invention, there is provided a filament assembly 22 for mounting on a source assembly 1 of a mass spectrometer, in which the filament assembly 22 comprises at least two electrical contact pads 315*a*, 315*b* on an outer surface. The electrical contact pads 315*a*, 315*b* may comprise any of the features disclosed above, for example the shape, other physical features, materials and/or methods of manufacture of the electrical contact pads 315*a*, 315*b*

According to another aspect of the present invention, there is provided a filament assembly for mounting on a source assembly of a mass spectrometer, comprising: a body; and two filament mounting arms extending outwardly from a surface of the body, wherein at least a portion of each filament mounting arm proximal to the distal end comprises first and second flat portions, parallel to one another.

The first and second filament mounting arms 321*a* and 321*b* may comprise any of the features as discussed above.

In another aspect of the present invention, there is provided: a filament element for a source of a mass spectrometer, comprised at least in part of a metal and coated at least in part with at least one of yttrium oxide and thorium dioxide.

In another aspect of the present invention, instead of taking the shape of a coil, the filament element 325 comprises a mesh made of suitable metals or metal alloys (not shown). The filament element may comprise a mesh made at least in part of at least one of rhenium, platinum, iridium, molybdenum, tantalum and tungsten.

In at least one embodiment, the filament element 325 may be spot welded or soldered to the distal ends (e.g. the flat portions) of the filament mounting arm 321*a*, 321*b*.

A benefit of a filament element comprising a mesh is that it may provide better sensitivity compared to a traditional filament element because the electrons from it are spread over a wider area (e.g. along a 2D plane rather than a 1D line). Consequently, this may reduce the mutual self-repulsion of the electrons (space charge effect) for a given emission current resulting in more electrons getting into the ionisation chamber. It was found by the inventors that a mesh filament element may be mechanically weaker than a wire (e.g., a coiled wire element). So as to reduce undue heat stress on the mesh element, the mesh element may be coated in yttrium oxide. This may have the effect of lowering the work function on the mesh meaning the mesh filament doesn't have to get as hot for the same level of emission.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

A. Filament Assembly

A1. A filament assembly for mounting to a source assembly of a mass spectrometer, the filament assembly comprising a body having one of:

- an aperture to receive a corresponding spigot provided by a source assembly; or
- a spigot to be received in a corresponding aperture on a source assembly.

A2. A filament assembly according to clause A1, wherein the aperture/spigot has at least one keying feature.

A3. A filament assembly according to any of clauses A1 to A2, wherein the aperture is configured to receive a corresponding spigot, or the spigot is configured to be received in a corresponding aperture, in a single rotational configuration.

A4. A filament assembly according to any of clauses A1 to A3, wherein the aperture and/or spigot has no planes of symmetry, or only one plane of symmetry.

A5. A filament assembly according to any of clauses A1 to A4, wherein the aperture and/or spigot has a cross section comprising a rounded rectangle or square, wherein the radius of one of the corners of the rounded rectangle or square is different to the radius of an opposite corner of the rounded rectangle or square.

A6. A filament assembly according to any of clauses A1 to A5, wherein the filament assembly further comprises a bore passing through the body which is substantially coaxial with the aperture/spigot, the bore for passing a screw through the body and into the source assembly, to secure the filament assembly to the source assembly, in use.

A7. A filament assembly according to any of clauses A1 to A6, wherein the aperture in the body is sized to receive a corresponding spigot provided by a said source assembly; or the spigot of the body is sized to be received in a corresponding aperture of said source assembly, with a substantially sliding fit.

A8. A filament assembly according to any of clauses A1 to A7, configured such that when the aperture in the body receives a corresponding spigot of said source assembly; or the spigot of the body is received in a corresponding aperture of said source assembly, the body is substantially retained relative to the source assembly.

A9. A filament assembly according to any of clauses A1 to A8, wherein the body further comprises at least two electrical contact pads provided on an outer surface.

A10. A filament assembly according to any of clauses A1 to A9, wherein the electrical contact pads are at least partially composed of gold or are gold plated.

A11. A filament assembly according to any of clauses A1 to A10, wherein the body further comprises a filament mounting.

A12. A filament assembly according to clause A11, wherein the filament mounting comprises two filament mounting arms, extending outwardly from the body.

A13. A filament assembly according to clause A12, wherein the filament mounting arms are comprised at least in part of Kovar® or gold, or are gold plated.

A14. A filament assembly according to any of clauses A12 to A13, wherein the body further comprises at least two electrical contact pads on an outer surface and each of the filament mounting arms is electrically connected to a respective one of the electrical contact pads.

A15. A filament assembly according to any of clauses A12 to A14, wherein the arms are angled with respect to one another.

A16. A filament assembly according to any of clauses A12 to A15, wherein the distal ends of the arm are closer to one another than the proximal ends thereof.

A17. A filament assembly according to any of clauses A12 to A16, wherein at least a portion of each filament mounting arm proximal to the distal end comprises at least one flat portion.

A18. A filament assembly according to any of clauses A12 to A17, wherein at least a portion of each filament mounting arm proximal to the distal end comprises first and second flat portions, parallel to one another.

A19. A filament assembly according to any of clauses A12 to A18, wherein at least a portion of each filament mounting arm proximal to the distal end is substantially rectangular in cross section.

A20. A filament assembly according to any of clauses A12 to A19, wherein the filament assembly further comprises a filament element, the filament element connected at each end to a respective one of the first and second arms proximate to the distal ends thereof.

A21. A filament assembly according to any of clauses A12 to A20, wherein the filament element is soldered to the distal ends of the filament mounting arms.

A22. A filament assembly according to any of clauses A12 to A21, further comprising a filament shroud, A23. A filament assembly according to clause A22, wherein the shroud is spot welded to at least one of the filament mounting arms.

A24. A filament assembly according to any of clauses A1 to A23, wherein the body is comprised at least in part of ceramic.

A25. A source assembly for a mass spectrometer, the assembly comprising:

a volume housing for retaining a repeller assembly; and at least one filament assembly according to any of clauses A1 to A24, secured to the volume housing.

A26. A source assembly according to clause A25, further comprising:

a base, the volume housing removably connectable to the base, and for retaining the repeller assembly therebetween.

A27. A source assembly according to clause A26, wherein the base comprises a plurality of electrical terminals and at least one filament assembly comprises a plurality of electrical contact pads for connection with a respective one of the electrical terminals on the base.

A28. An inner source assembly according to clause A27, wherein the electrical terminals on the base are spring-loaded pins.

A29. An inner source assembly according to clause A27 or A28, wherein the volume housing is movable between a first axial position relative to the base in which the electrical terminals are not connected to the contact pads, and a second position relative to the base in which the electrical terminals are connected to the contact pads.

A30. A filament assembly according to any of clauses A1 to 24, further comprising any of the features of any of clauses B1 to B4, C1 to C12, D1 to D4 or E1 to E3.

B Filament Assembly with Pads

B1 A filament assembly for mounting to a source assembly of a mass spectrometer, the filament assembly comprising at least two electrical contact pads on an outer surface.

B2. A filament assembly according to clause B2, wherein the electrical contact pads are at least partially composed of gold or are gold plated or coated.

B3 A filament assembly according to clause B2, wherein the electrical contact pads are coated by vacuum deposition or sputtering.

B4. A filament assembly according to any of clauses B1 to B3, further comprising any of the features of clauses A1 to 29, C1 to C12, D1 to D4 or E1 to E3.

C Filament Mounting Arms

C1. A filament assembly for mounting on a source assembly of a mass spectrometer, comprising:

a body; and two filament mounting arms extending outwardly from a surface of the body, wherein at least a portion of each filament mounting arm proximal to the distal end comprises first and second flat portions, parallel to one another.

C2. A filament assembly according to clause C1, wherein at least a portion of each filament mounting arm proximal to the distal end is substantially rectangular in cross section.

C3. A filament assembly according to any of clauses C1 and C2, wherein the two filament mounting arms are substantially identical to one another.

C4. A filament assembly according to any of clauses C1 to C3, wherein the filament mounting arms are comprised at least in part of Kovar®.

C5 A filament assembly according to any of clauses C1 to C4, wherein the body further comprises at least two electrical contact pads on an outer surface and each of the filament mounting arms is electrically connected to a respective one of the electrical contact pads.

C6. A filament assembly according to any of clauses C1 to C5, wherein the arms are angled with respect to one another.

C7. A filament assembly according to any of clauses C1 to C5, wherein the distal ends of the arms are closer to one another than the proximal ends thereof.

C8. A filament assembly according to any of clauses C1 to C7, wherein the filament assembly further comprises a filament element, the filament element connected at each end to a respective one of the first and second arms proximate to the distal ends thereof.

C9. A filament assembly according to any of clauses C1 to C8, wherein the filament element is soldered to the distal ends of the filament mounting arms.

C10. A filament assembly according to any of clauses C1 to C9, further comprising a filament shroud.

C11. A filament assembly according to any of clauses C1 to C1, wherein the body is comprised at least in part of ceramic.

C12. A filament assembly according to any of clauses C1 to C11, further comprising any of the features of clauses A1 to A29 and B1 to B4, D1 to D4 or E1 to E3.

D Filament Element

D1. A filament element for a source of a mass spectrometer, comprised at least in part of a metal and coated at least in part with at least one of yttrium oxide and thorium dioxide.

D2. A filament element according to clause D1, wherein the filament element is comprised at least in part of at least one of rhenium, platinum, iridium, molybdenum, tantalum and tungsten.

Representative Features

D3. A filament element according to clause D1, wherein the filament element is comprised of rhenium and coated in yttrium oxide.

D4. A filament element according to any of clauses D1 to D3, wherein the filament element comprises a mesh.

D5. A filament element according to any of clauses D1 to D4, further comprising any of the features of clauses A1 to A29, B1 to B4, C1 to C12 or E1 to E3.

E. Mesh Filament

E1 A filament element comprising a mesh.

E2. A filament element according to clause E1, wherein the mesh is made at least in part of at least one of rhenium, platinum, iridium, molybdenum, tantalum and tungsten.

E3. A filament element according to clause E1, wherein the mesh is comprised of rhenium and coated in yttrium oxide.

E4. A filament element according to any of clauses E1 to E3, further comprising any of the features of clauses A1 to A29, B1 to B4, C1 to C12 or D1 to D4.

The invention claimed is:

1. A filament assembly for mounting to a source assembly of a mass spectrometer, the filament assembly comprising a body having one of:

an aperture to receive a corresponding spigot provided by a source assembly; or a spigot to be received in a corresponding aperture on the source assembly, wherein the aperture/spigot has a longitudinal axis and the body further comprises at least two electrical contact pads each having a surface having a plane, provided on an outer surface thereof, the plane of the surface of the at least two electrical contact pads being substantially parallel to the longitudinal axis.

2. A filament assembly according to claim 1, wherein the aperture/spigot has at least one keying feature.

3. A filament assembly according to claim 1, wherein the aperture is configured to receive a corresponding spigot, or the spigot is configured to be received in a corresponding aperture, in a single rotational configuration.

4. A filament assembly according to claim 1, wherein the aperture and/or spigot has no planes of symmetry, or only one plane of symmetry.

5. A filament assembly according to claim 1, wherein the aperture and/or spigot has a cross section comprising a rounded rectangle or square, wherein the radius of one of the corners of the rounded rectangle or square is different to the radius of an opposite corner of the rounded rectangle or square.

6. A filament assembly according to claim 1, wherein the filament assembly further comprises a bore passing through the body which is substantially coaxial with the aperture/spigot, the bore for passing a screw through the body and into the source assembly, to secure the filament assembly to the source assembly, in use.

7. A filament assembly according to claim 1, wherein the aperture in the body is sized to receive a corresponding spigot provided by the source assembly; or the spigot of the body is sized to be received in a corresponding aperture of said source assembly, with a substantially sliding fit.

8. A filament assembly according to claim 1, configured such that when the aperture in the body receives a corresponding spigot of the source assembly; or the spigot of the body is received in a corresponding aperture of the source assembly, the body is substantially retained relative to the source assembly.

9. A filament assembly according to claim 1, wherein the body further comprises a filament mounting, the filament mounting comprising two filament mounting arms, extending outwardly from the body.

10. A filament assembly according to claim 9, wherein each of the two filament mounting arms is electrically connected to a respective one of the at least two electrical contact pads.

11. A filament assembly according to claim 9, wherein distal ends of the arms are closer to one another than proximal ends thereof.

12. A filament assembly according to claim 9, wherein at least a portion of each of the two filament mounting arms proximal to the distal end comprises at least one flat portion.

13. A filament assembly according to claim 9, wherein at least a portion of each of the two filament mounting arms proximal to the distal end comprises first and second flat portions that are parallel to one another.

14. A filament assembly according to claim 9, further comprising a filament element connected at each end to a respective one of the two filament mounting arms proximate to the distal ends thereof.

15. A filament assembly according to claim 9, further comprising a filament shroud attached to at least one of the two filament mounting arms.

16. A filament assembly according to claim 1, further comprising:

a volume housing for retaining a repeller assembly, wherein the filament assembly is secured to the volume housing.

17. A filament assembly according to claim 16, further comprising:

a base, the volume housing removably connectable to the base, and for retaining the repeller assembly therebetween, wherein the base comprises a plurality of electrical terminals, each electrical contact pad on the body of the filament assembly for connection with a respective one of the electrical terminals on the base, wherein the electrical terminals on the base are spring-loaded pins.

18. A filament assembly according to claim 17, wherein the volume housing is movable between a first axial position relative to the base in which the electrical terminals are not connected to the contact pads, and a second position relative to the base in which the electrical terminals are connected to the contact pads.

19. A filament assembly according to claim 1, further comprising:

two filament mounting arms extending outwardly from a surface of the body, wherein at least a portion of each of the two filament mounting arms proximal to the distal end comprises first and second flat portions, parallel to one another.

20. A filament assembly according to claim 14, wherein the filament element is comprised at least in part of a metal and coated at least in part with at least one of yttrium oxide and thorium dioxide, and/or the filament element comprises a mesh.

* * * * *